G. A. JOHNSON.
DRAFT RIGGING FOR RAILWAY CARS.
APPLICATION FILED OCT. 9, 1913.
1,122,940.
Patented Dec. 29, 1914.
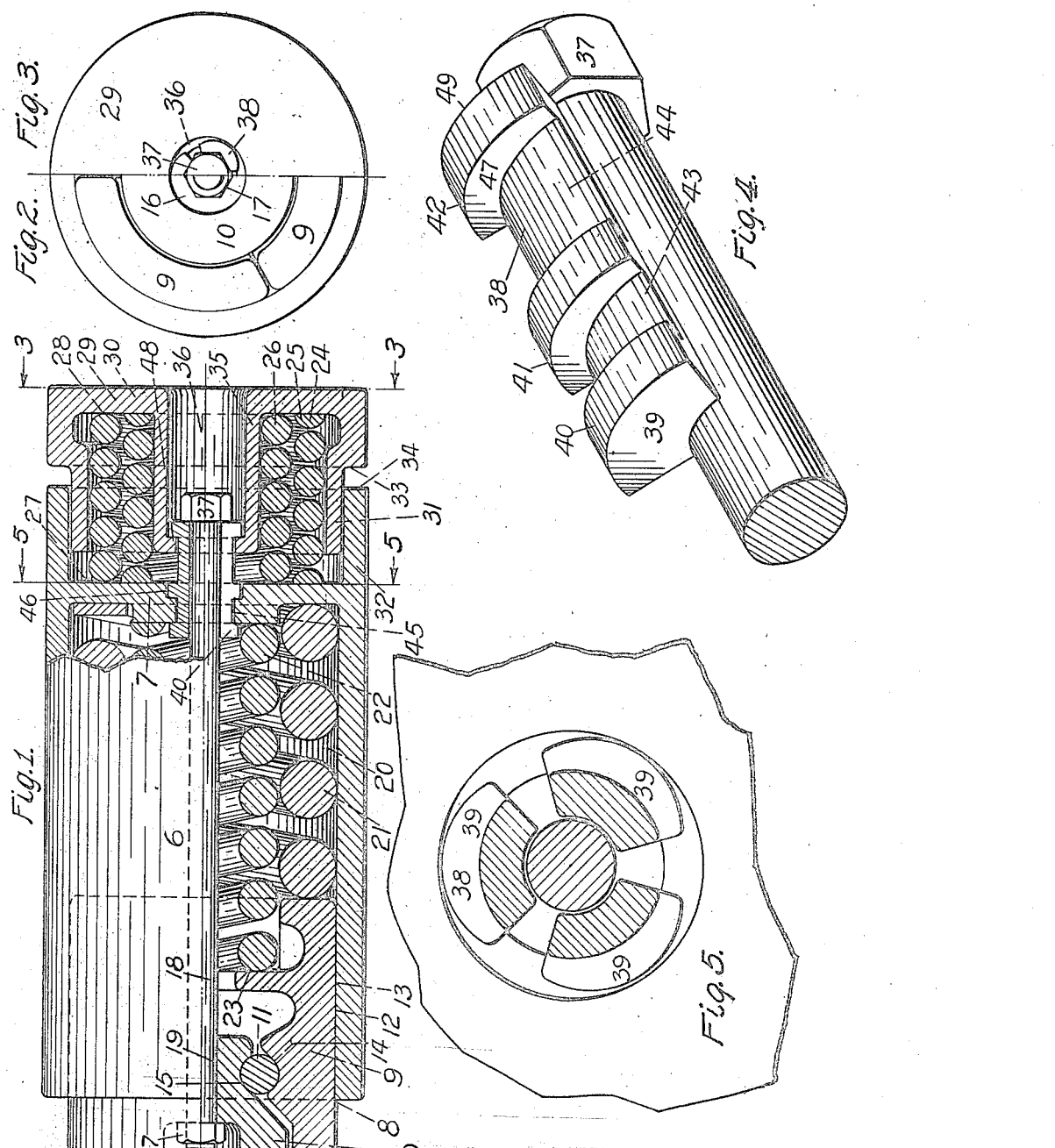
INVENTOR.
George A. Johnson

UNITED STATES PATENT OFFICE.

GEORGE A. JOHNSON, OF CHICAGO, ILLINOIS, ASSIGNOR TO WILLIAM H. MINER, OF CHICAGO, ILLINOIS.

DRAFT-RIGGING FOR RAILWAY-CARS.

1,122,940. Specification of Letters Patent. Patented Dec. 29, 1914.

Application filed October 9, 1913. Serial No. 794,198.

*To all whom it may concern:*

Be it known that I, GEORGE A. JOHNSON, a citizen of the United States, residing at Chicago, in the county of Cook and State of Illinois, have invented a certain new and useful Improvement in Draft-Rigging for Railway-Cars, of which the following is a full, clear, concise, and exact description, reference being had to the accompanying drawings, forming a part of this specification.

My invention relates to improvements in draft rigging for railway cars.

The object of my invention is to provide a draft gear having a preliminary spring, and in which the preliminary spring operates independently of the main springs and other cushioning devices of the gear.

In the drawings forming a part of this specification Figure 1 is a side elevation partly in central longitudinal section of a draft gear embodying my invention. Fig. 2 is a front-end view thereof. Fig. 3 is a rear end view thereof. Fig. 4 is an enlarged detail showing in perspective the rear portion of the connecting bolt, and a segment of the locking key surrounding the same. Fig. 5 is a cross section taken on line 5—5 of Fig. 1.

Referring to the drawings the numeral 6 represents a shell, preferably cylindrical in shape or circular in cross section, open at its forward end and provided near its rear end with a preferably integral transverse partition 7. Within the shell in front of the said partition is disposed the friction mechanism 8, consisting of the friction shoes 9, which are preferably three in number, the wedge 10, and the anti-friction rolls 11. Each of the friction shoes is provided with a friction face 12, engaging the inner friction face 13, of the shell and a wedging face 14. The wedge 10, is preferably pyramidal in form and has wedging faces 15, equaling in number the friction shoes. Between each wedging face of the wedge and the adjacent wedging face of a friction shoe is disposed one of the anti-friction rolls 11. The wedge 10, is forwardly provided with a recess 16, to receive the nut 17, of the connecting rod 18, which passes through the perforation 19, with which the wedge is provided, and through the transverse wall 7, of the shell 6.

Between the walls 7, of the friction shell and the friction mechanism is mounted the main springs 20, comprising preferably an outer spring 21, seated at its forward end against the rear ends of the friction shoes, and the inner spring 22, forwardly seated in preferable construction against the internal shoulders 23, with which the friction shoes are provided.

The preliminary spring 24, preferably comprises an outer spring 25, and an inner spring 26, nested within the spring 25. The said springs are forwardly seated against the rear face 27, of the transverse wall 7, of the shell, and rearwardly seated against the inner face 28, of the preliminary follower 29. The preliminary follower 29, consists preferably of a transverse plate 30, forwardly provided with a peripheral collar 31, adapted to reciprocate within the rear portion 32, of the friction shell, and provided with a shoulder 33, adapted to engage the rear end 34, of the friction shell, and limit the inward movement of the preliminary follower. The preliminary follower is also centrally provided with a forwardly extended boss 35, around which the preliminary springs are seated. Within the boss is provided a recess 36, within which the head 37, of the connecting rod is received.

The forward end of the boss 35, of the preliminary follower, and the transverse wall 7, of the shell 6, are provided with central registering perforations to receive a locking device 38, comprising a plurality, preferably three segmental members 39, arranged about the connecting rod 18. Each of said members 39, is provided with a forward shoulder 40, an intermediate shoulder 41, and a rear shoulder 42, forming when the said members are in assembled position three annular shoulders about the connecting rod, with the annular groove 43, between the front shoulders 40, and intermediate shoulders 41, and the annular groove 44, between the intermediate shoulders 41 and the rear shoulders 42. The perforation in the transverse wall 7, of the shell is designated by the numeral 45, the wall surrounding said opening being adapted to engage within the groove 43, in the locking device when the same is in assembled position. The wall 7 on the rear side thereof is provided with an annular enlargement or countersink 46 alined with the perforation 45 and within which the shoulders 41 are received when the parts are assembled; the forward faces 47, of the rear shoulders 42, of the locking device 38, engage against the inwardly turned annular shoulder 47, surrounding the perforation 48, in the forward end of the boss with which the preliminary follower is provided. The head 37, of the connecting rod engages against the rear face 49, of the rear shoulder 42, of the locking devices.

As will be understood, when the parts are assembled as shown in Fig. 1, shoulders 40 and 41 engage on opposite sides of the wall 7 surrounding the opening 45 therein, thus preventing movement of the locking device longitudinally relatively to the shell.

It will be clear that the preliminary springs and preliminary follower may be placed in position at the rear end of the shell, and that thereupon the parts of the locking device 38, may be inserted one at a time, and that the same may be secured in their assembled position by the insertion of the connecting rod which will prevent the collapsing of the members thereof, and that by means of the device described, the preliminary spring may be placed under such initial compression as may be desired, and that the compression resisting power of the same may be predetermined and fixed in relation to the action of the other parts of the gear. It will also be clear that the preliminary spring operates independently of the main springs and of the friction mechanism.

Claims:

1. In a draft gear for railway cars, in combination, a shell, friction mechanism and springs within the shell, a preliminary follower, preliminary springs seated between said follower and the shell, a locking device engaging the preliminary follower to the shell, said locking device comprising a plurality of segmental members adapted to rigidly engage the shell at one end, and to slidingly engage the preliminary follower at the other end.

2. In a draft gear for railway cars, a shell, preliminary springs, and a preliminary follower, in combination with a plurality of segmental members having shoulders to engage the shell at one end and the preliminary follower at the other end, and means to maintain segmental members in locked position with the shell and in engagement with the preliminary follower.

3. In a draft gear for railway cars, a shell having a transverse partition therein, a preliminary spring seated against said partition, a preliminary follower engaging the preliminary spring, a locking device comprising segmental members having annular grooves, the said partition being received in one of said grooves, and the preliminary follower slidingly engaging within the other of said grooves, and means passing through said segmental members to hold the same in assembled position.

GEORGE A. JOHNSON

Witnesses:
Eleanor L. Nash,
Wm. H. Haight.